(12) United States Patent
Yamanaka et al.

(10) Patent No.: US 7,691,483 B2
(45) Date of Patent: Apr. 6, 2010

(54) RESIN-COATED METAL SHEET

(75) Inventors: Yoichiro Yamanaka, Fukuyama (JP); Takeshi Suzuki, Chiba (JP); Hiroki Iwasa, Fukuyama (JP); Junichi Kitagawa, Kawasaki (JP); Toyofumi Watanabe, Chiba (JP); Shinsuke Watanabe, Fukuyama (JP); Mitsunori Ota, Fukuyama (JP)

(73) Assignee: JFE Steel Corporation, Tokyo (JP)

( * ) Notice: Subject to any disclaimer, the term of this patent is extended or adjusted under 35 U.S.C. 154(b) by 481 days.

(21) Appl. No.: 10/594,533

(22) PCT Filed: Mar. 30, 2005

(86) PCT No.: PCT/JP2005/006732

§ 371 (c)(1),
(2), (4) Date: Sep. 27, 2006

(87) PCT Pub. No.: WO2005/095104

PCT Pub. Date: Oct. 13, 2005

(65) Prior Publication Data

US 2007/0202309 A1    Aug. 30, 2007

(30) Foreign Application Priority Data

Apr. 1, 2004   (JP) ............... 2004-109078
Apr. 1, 2004   (JP) ............... 2004-109079

(51) Int. Cl.
  *B32B 15/09*   (2006.01)
  *B32B 27/08*   (2006.01)
(52) U.S. Cl. .................. 428/458; 428/332; 428/336; 428/457
(58) Field of Classification Search .......... None
See application file for complete search history.

(56) References Cited

U.S. PATENT DOCUMENTS 6,277,455 B1 *  8/2001  Shimizu et al. ............ 428/35.9

FOREIGN PATENT DOCUMENTS

| JP | 03-079344 A | 4/1991 |
| JP | 03-212433 A | 9/1991 |
| JP | 05-092535 A | 4/1993 |
| JP | 05-156040 A | 6/1993 |
| JP | 05-331302 A | 12/1993 |
| JP | 06-155660 A | 6/1994 |
| JP | 07-144396 A | 6/1995 |
| JP | 07-195617 A | 8/1995 |
| JP | 07-314625 A | 12/1995 |
| JP | 10-110046 A | 4/1998 |
| JP | 11-079189 A | 3/1999 |
| JP | 2004-268574 A | 9/2004 |

* cited by examiner

*Primary Examiner*—Monique R Jackson
(74) *Attorney, Agent, or Firm*—Frishauf, Holtz, Goodman & Chick, P.C.

(57) ABSTRACT

The resin-coated metal sheet is composed of: a metal sheet; a lower resin layer containing a hydrophilic copolyester, formed on at least one side of the metal sheet; and an upper resin layer containing a polyester containing a diol component composed of a diol derivative of 1 to 10% by mole of alicyclic compound and 99 to 90% by mole of ethylene glycol, and a dicarboxylic acid component consisting of terephthalic acid, formed on the lower resin layer. The sum of cyclic trimer of alkylene terephthalate existing in the upper resin layer and the lower resin layer is 0.9% or less by mass. Since the manufacture of food cans using the resin-coated metal sheet does not induce white haze phenomenon and retort blushing phenomenon on outer surface of the can even after retorting, the decorative appearance on outer surface of the can is not deteriorated.

13 Claims, 1 Drawing Sheet

RESIN-COATED METAL SHEET

This application is the United States national phase application of International Application PCT/JP2005/006732 filed Mar. 30, 2005.

TECHNICAL FIELD

The present invention relates to a resin-coated metal sheet used for body, bottom, and lid of can for food, and the like.

BACKGROUND ART

Metal cans which are a kind of food packaging containers have high mechanical strength and excellent heat resistance and air-tightness. With these advantageous characteristics, metal cans are able to store contents over a long period. In addition, they accept the contents at high temperatures and seal the contents in that high temperature state, and are able to store the contents in a heated state. Since they allow sterilization such as retorting easily, they acquire high reliability of safety and hygiene as the packaging containers. Furthermore, they have advantages of relatively easy for classifying and collecting the used cans. The term "retorting" referred herein signifies the heat treatment of cans filled with contents by high temperature steam or the like to sterilize the contents by heat.

Conventionally the metallic base materials for food cans adopt electrolytic chromium coated steel sheet (also referred to as "ECCS"), aluminum sheet, and the like. Since these metal sheets for containers are coated by solvent-type coating consisting mainly of a thermosetting resin not only to prevent corrosion but also to keep the flavor of contents (on the surface of the metal sheet facing the inner surface of the container) and to give decorative appearance and to protect printed face (on the surface of the metal sheet facing the outer surface of the container). The coating technique, however, has complex baking process and takes a long treatment time, and also raises a problem of discharging large amounts of solvent. To solve these problems, a current main stream of the technology applies lamination of thermoplastic resin film on the heated metal sheet, and many kinds of technologies have been provided as the lamination method. The term "lamination" referred to herein signifies that at least one side of the metal sheet is covered by a resin film.

For example, JP-A-5-156040 and JP-A-7-195617, (the term "JP-A" referred to herein signifies the "Unexamined Japanese Patent Publication"), describe a thermo-compression-bondable polyester film for lamination.

On the other hand, JP-A-3-212433 and JP-A-5-92535 describe a manufacturing method of metal sheet laminated with a thermo-compression-bondable polyester film, and further a manufacturing method of high-drawing ratio can from thus obtained laminated metal sheet.

With these conventional metal sheets coated with polyester resin, however, when the resin-coated surface faces outer side of a food can, the oligomer in the polyester resin often precipitates on the resin surface during the high temperature sterilization such as retorting. The precipitate gives appearance of white powder, which raises a problem of damaging the decorative appearance, (what is called the "white haze phenomenon"). Furthermore, during the retorting, there occurs a phenomenon of discoloration in clouding the resin layer itself, (what is called the "retort blushing phenomenon"). Therefore, the request for solving these decorative appearance problems on outer surface of the can has become strong.

The current main stream of preventive technology against white haze is the one to decrease the quantity of oligomer in the polyester resin. For example, JP-A-10-110046 discloses that the precipitation of oligomer is suppressed even in high temperature treatment such as retorting if only the oligomer quantity in the film is restricted to 1.3% by mass or less. The retorting applied to food cans is, however, generally a high temperature and longtime treatment at 120° C. or above for 90 minutes. As a result, at a level of 1.0% by mass or more of oligomer quantity given in Examples of the disclosure, the prevention of white haze is practically impossible. In JP-A-11-79189, there is disclosed a technology to suppress elution of ester oligomers in the polyester resin into water. Even with the technology, however, the maintaining of decorative appearance does not reach the satisfactory level.

Regarding the retort blushing phenomenon, which is another problem of decorative appearance, several improving technologies have been proposed. For example, JP-A-6-155660 proposes a technology to laminate a polyester resin on a metal sheet. Specifically, the patent publication discloses a technology to control the crystallinity in the resin layer contacting the metal sheet and the crystal orientation in the resin layer not-contacting the metal sheet. The technology was established by speculating the retort blushing phenomenon as follows. That is, since the rate of crystallization under the retorting of amorphous resin layer contacting the metal sheet differs between the dew-forming part and the not dew-forming part on the surface of the metal sheet, these parts become resin layers having different light refractive index and volume from each other, which induces scattering of light to give whitened surface appearance.

In JP-A-5-331302, it is speculated that the rate of crystallization of polymer is low during retorting, thus the crystals slowly grow to coarse grains, thereby causing the retort blushing phenomenon. Based on the speculation, the patent publication proposes the enhancement of the rate of crystallization of polymer during retorting to generate large numbers of fine crystals. Since, however, both technologies do not accurately grasp the mechanism of retort blushing phenomenon, maintaining decorative appearance is not sufficient, and they are not a kind of adequate improvement technologies.

The present invention has been perfected to solve the above problems relating to the outer surface of food cans, and an object of the present invention is to provide a resin-coated metal sheet which does not induce white haze phenomenon and retort blushing phenomenon even after retorting.

DISCLOSURE OF THE INVENTION

The present invention provides a resin-coated metal sheet having: a metal sheet; a lower resin layer containing a hydrophilic copolyester, formed on at least one side of the metal sheet; and an upper resin layer containing a copolyester derived from a diol component composed of 1 to 10% by mole of a diol derivative of alicyclic compound and 99 to 90% by mole of ethylene glycol, with a dicarboxylic acid component consisting of terephthalic acid, formed on the lower resin layer, wherein the sum of cyclic trimer of alkylene terephthalate being contained in the upper resin layer and the lower resin layer is 0.9% or less by mass.

In the resin-coated metal sheet, the diol derivative of alicyclic compound is preferably a diol derivative of cycloparaffin. Furthermore, in the resin-coated metal sheet, the diol derivative of cycloparaffin is more preferably 1,4-cyclohexanedimethanol.

For any one of the resin-coated metal sheets described above, the hydrophilic copolyester is preferably a copolyalkylene terephthalate containing 1 to 10% by mole of aromatic dicarboxylic acid having metal sulfonate group as the dicarboxylic acid component.

For any one of the resin-coated metal sheets described above, the thickness of the lower resin layer is preferably in a range from 0.5 to 5 μm.

For any one of the resin-coated metal sheets described above, the plane orientation factor of the upper resin layer is preferably in a range from 0.01 to 0.05.

For any one of the resin-coated metal sheets described above, each of the upper resin layer and the lower resin layer is preferably a biaxially stretched polyester film having the crystal size on the (100) plane in a range from 6 to 8 nm, determined by X-ray diffractometry.

Any one of the resin-coated metal sheets described above preferably further have a third resin layer containing a polyester containing any of 0.1 to 2% by mass of wax and 0.1 to 5% by mass of olefin resin, formed on the metal sheet on opposite side to the side of the upper and the lower resin layers.

For anyone of the resin-coated metal sheets described above, the plane orientation factor of the third resin layer is more preferably in a range from 0.02 to 0.06.

For any one of the resin-coated metal sheets described above, the third resin layer is more preferably a biaxially stretched polyphthalate ester which has the relaxation time $T1\rho$ at 1,4 position carbons of benzene ring of 150 msec or more, determined by structural analysis of solid high resolution NMR. For the resin-coated metal sheet, the zone in the third resin layer having 0.02 or smaller double refractive index is more preferably a zone less than 5 μm of depth from the interface with the metal sheet.

For anyone of the resin-coated metal sheets described above, it is more preferable that at least one layer selected from the group consisting of the upper resin layer, the lower resin layer, and the third resin layer contains a coloring matter. For the resin-coated metal sheets, it is specifically preferred that the coloring matter is a dis-azo organic pigment.

Furthermore, the present invention provides a resin-coated metal sheet for container, having a metal sheet and a resin layer containing a polyester as the main component, being formed on at least one side of the metal sheet, wherein the resin layer is an accumulated resin layer having an upper layer and a lower layer contacting the metal sheet, the upper layer of the resin layer is formed by a polyester containing a dicarboxylic acid component mainly composed of terephthalic acid and a glycol component mainly composed of ethyleneglycol and 1,4-cyclohexanedimethanol, while the content of the 1,4-cyclohexanedimethanol in the total glycol component is in a range from 1 to 10% by mole, the lower layer of the resin layer is formed by a hydrophilic copolyester, and the content of oligomer (cyclic trimer) in the accumulated resin is in a range from 0.3 to 0.9% by mass.

BEST MODE FOR CARRYING OUT THE INVENTION

Figure 1:
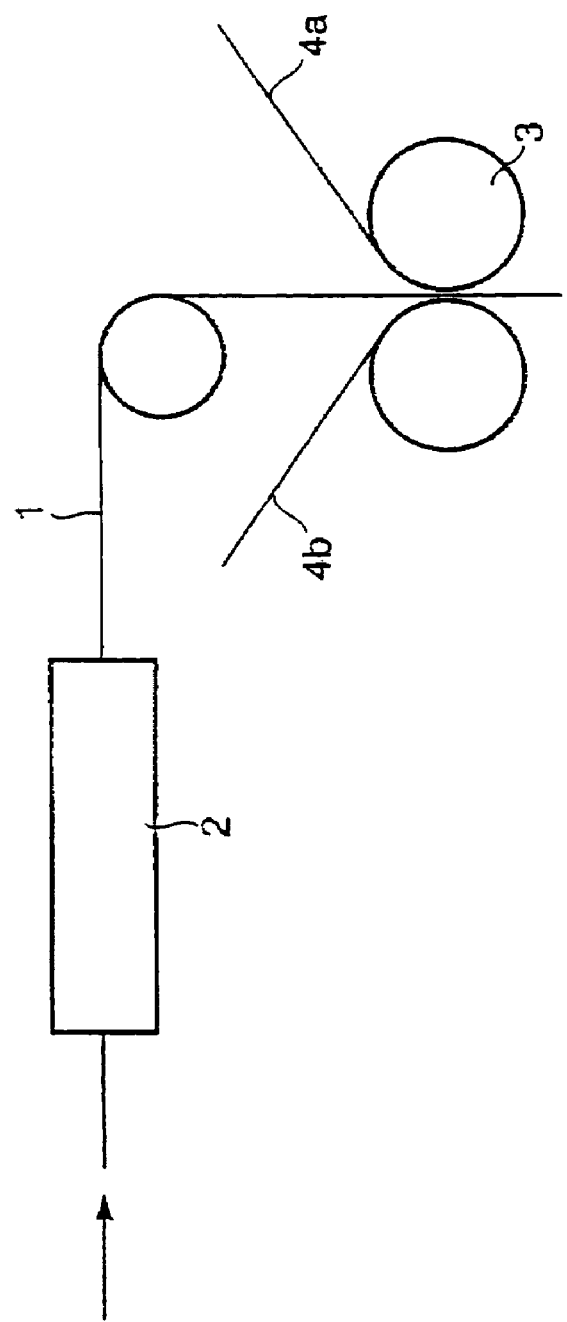
FIG. 1 illustrates an example of the coating apparatus for metal sheet.

The present invention is described in detail in the following.

To attain the above object, the inventors of the present invention carried out detail study, and have invented a resin-coated metal sheet structured by: a metal sheet; a lower resin layer containing a hydrophilic copolyester, formed on at least one side of the metal sheet; and an upper resin layer containing a polyester derived from a diol component composed of 1 to 10% by mole of a diol derivative of alicyclic compound and 99 to 90% by mole of ethylene glycol, with a dicarboxylic acid component consisting of terephthalic acid, formed on the lower resin layer, wherein the sum of cyclic trimer of alkylene terephthalate being contained in the upper resin layer and the lower resin layer is 0.9% or less by mass.

(Metal Sheet)

The metal sheet as the base material for the present invention can use aluminum sheet, mild steel sheet, and the like which are widely used as the materials for cans. Most suitable material for the metal sheet of the present invention includes a surface-treated steel sheet having two-layer coating, (what is called ECCS), consisting of metallic chromium as the lower layer and chromium hydroxide as the upper layer. The coating weight of the metallic chromium layer and of the chromium hydroxide layer of ECCS is not specifically limited. In view of adhesion after forming and of corrosion resistance, however, the coating weight is preferably in a range from 70 to 200 mg/m$^2$ for the metallic chromium layer and from 10 to 30 mg/m$^2$ for the chromium hydroxide layer, as chromium.

(Lower Resin Layer)

The lower resin layer according to the present invention contains a hydrophilic copolyester to prevent retort blushing. An example of suitable hydrophilic copolyester is a copolyalkylene terephthalate prepared by copolymerizing 1 to 10% by mole of aromatic dicarboxylic acid having metal sulfonate group as the dicarboxylic acid component. Examples of the aromatic dicarboxylic acid containing metal sulfonate group are sodium 5-sulfoisophthalate, sodium 2-sulfoterephthalate, sodium 4-sulfophthalate, sodium 4-sulfo-2,6-naphthalenedicarboxylic acid. Further examples thereof are a compound formed by substituting the sodium in the above-examined compounds by other alkali metal (potassium lithium, and the like), and a derivative thereof. As of these examples, alkali 5-sulfoisophthalate is preferred, and sodium 5-sulfoisophthalate is specifically preferred.

A copolyester containing an aromatic dicarboxylate component containing a metal sulfonate group within a range specified by the present invention shows an effect of suppressing the retort blushing phenomenon being generated during retorting. The inventors of the present invention gave detail analysis of the retort blushing phenomenon during retorting, and found that the entering of water vapor into the resin layer covering the can body induces the formation of bubbles inside the resin layer, which bubbles cause the scattering of light at the bubble section. As a result, it was confirmed that the suppression of bubble-formation in the resin layer is important to improve the characteristics, and that the methods described in the Background Art cannot give adequate solution.

The water vapor entered the resin layer diffuses in the resin to reach near the interface with the metal sheet. Immediately after the start of retorting, the contents filled in the can are in a state of close to room temperature so that a temperature gradient occurs from the outside of the can to the inside thereof. That is, the water vapor which diffuses in the resin is cooled toward the metal sheet, and the water vapor is liquefied in the vicinity of the interface, thus becoming condensate to form vacuoles. When the can totally becomes high temperature with treatment time, it is presumed that the vaporization of once-formed vacuoles occurs at interface, and the vaporized portion becomes bubbles to remain in the resin even after the retorting. Since the bubble portion has different refractive index from that of the surrounding resin, scattering of light is induced to give whitening appearance on the surface of the resin.

Therefore, suppression of the retort blushing is done by (a) preventing the entering of water vapor and/or (b) preventing the formation of vacuoles which become origin of bubbles. For the case of (a), vapor-deposition film may be applied. However, the vapor-deposition film is not applicable to can-forming because the vapor-deposition layer is poor in formability. Although other special films may be applied, they are expensive and cause significant cost increase. To this point, the inventors of the present invention focused on the technology of (b), and gave detail study. The study revealed that the application of hydrophilic resin is effective. By forming a hydrophilic resin to contact with the metal sheet, the water molecules are entrapped in the resin even when the water vapor is liquefied, thus effectively suppressing the formation of vacuoles accompanied with the water condensation.

The copolyester prepared by copolymerizing 1 to 10% by mole of aromatic dicarboxylic acid having metal sulfonate group, as the dicarboxylic acid component, varies the polarity depending on the ionic property of the metal sulfonate group. If the copolymerization degree of the aromatic dicarboxylic acid having metal sulfonate group is smaller than 1% by mole, the hydrophilic property is insufficient, and the formation of condensate cannot be effectively prevented, thereby inducing whitening of resin. With the increase in the copolymerization degree of the aromatic dicarboxylic acid having metal sulfonate group, however, the cohesive power between polyester molecular chains increases, thus significantly increasing the melt viscosity. If the copolymerization degree of the aromatic dicarboxylic acid having metal sulfonate group exceeds 10% by mole, gelling caused by the ionic bond between molecules becomes significant, which leads to excessively high melt viscosity, thereby resulting in difficulty in covering the resin. Therefore, an adequate range of the copolymerization degree of the aromatic dicarboxylic acid having metal sulfonate group is from 1 to 10% by mole.

The copolyalkylene terephthalate prepared by copolymerizing 1 to 10% by mole of aromatic dicarboxylic acid having metal sulfonate group, as the dicarboxylic acid component, contained in the lower resin layer according to the present invention is preferably composed of a repeating unit of alkylene terephthalate in an amount of 80% by mole or more. Preferred alkylene terephthalate includes ethylene terephthalate, butylene terephthalate, and propylene terephthalate. As of these, a copolyester having ethylene terephthalate as the repeating unit in an amount of 80% by mole or more is preferable because of the high strength and superior flexibility.

The copolyalkylene terephthalate prepared by copolymerizing 1 to 10% by mole of aromatic dicarboxylic acid having metal sulfonate group as the dicarboxylic acid-component according to the present invention may further copolymerize other third component within a range not to inversely affect the object of the present invention. Examples of the compound applicable instead of terephthalic acid are aromatic, aliphatic, and alicyclic dicarboxylic acids such as isophthalic acid, 2,6-naphthalenedicarboxylic acid, diphenyldicarboxylic acid, adipic acid, sebacic acid, and 1,4-cyclohexanedicarboxylic acid, and a derivative thereof. Applicable alkylene glycol component includes aromatic, aliphatic, or alicyclic diols compound such as ethylene glycol, propylene glycol, butylene glycol, and polyalkylene glycol. To these polymers, there may further be contained, at need, antioxidant, stabilizer, antistatic agent, deodorant, micropore-forming agent, and the like. The term "be contained" referred to herein signifies all kinds of states integrating with the resin, such as adhesion, lamination, mixing, or modification, and the state is generally achieved by adding these substances when the resin is melted in the film-forming step.

The thickness of the lower resin layer according to the present invention is preferably in a range from 0.5 to 5 μm. If the thickness is 0.5 μm or larger, no bubble is formed within the lower resin layer. Thicknesses not larger than 5 μm show a tendency of improving the adhesion in humid state. Consequently, an adequate thickness of the lower resin layer is in a range from 0.5 to 5 μm.

(Upper Resin Layer)

The upper resin layer of the present invention contains, as the main component, a copolyester containing a diol component composed of 1 to 10% by mole of diol derivative of an alicyclic compound and 99 to 90% by mole of ethylene glycol, with a dicarboxylic acid component consisting of terephthalic acid. The term "main component" referred to herein signifies that the copolyester is contained in the total resin of the upper resin layer in amounts of 85% by mole or more, and preferably 90% by mole or more. Examples of the component raw material for the polyester being containable in the upper resin layer as the auxiliary component are the following. As the dicarboxylic acid component, isophthalic acid, phthalic acid, 2,6-naphthalenedicarboxylic acid, adipic acid, and sebacic acid are the examples. As the glycol component, diethylene glycol, propylene glycol, butandiol, neopentyl glycol, and triethylene glycol are the examples.

The "alicyclic compound" forming the diol derivative of the alicyclic compound may be any of cycloparaffin, cycloolefin, and cycloalkyne. Although these alicyclic compounds are generally 3 to 8 membered rings, specifically 6 or 5 membered rings are preferred. The "diol derivative" may be the one formed by directly bonding two hydroxyl groups to those cyclic carbons, or the one formed by indirectly bonding them via other bond. The indirect bonding includes alkylene group, alkylidene group, and/or oligo methylene group having about 3 to 10 carbons.

The diol derivative of the alicyclic compound as the raw material for forming the copolyester being contained in the upper resin layer effects the prevention of white haze. When a diol derivative of the alicyclic compound as the diol component is used together with ethylene glycol, the molecular chain of the obtained copolyester shows irregularity because the alicyclic compound has large rotational freedom of carbon-carbon bond. If the irregular-chain copolyester is melted and extruded to form as the resin of upper layer, the copolymer is expected to play a role of suppressing the formation of oligomer in the resin, and/or entrapping the oligomer which tends to diffuse toward the surface of the resin. As a result, the precipitation of oligomer during retorting can be prevented. Therefore, as the diol derivative of the alicyclic compound, a diol derivative of cycloparaffin in which the ring is saturated and the deformation freedom is large is more preferable. As of these diol derivatives, 1,4-cyclohexane dimethanol, (hereinafter referred also to as "1,4-CHDM"), is preferable. The inventors of the present invention have confirmed that, among the oligomers inducing white haze phenomenon, a cyclic trimer of alkylene terephthalate has the strongest influence. The 1,4-cyclohexane dimethanol component in the copolyester structuring the upper resin layer is extremely effective to suppress the formation of or to entrap the oligomers, specifically cyclic trimer of alkylene terephthalate.

The copolyester in the upper resin layer containing a specified amount of 1,4-CHDM as the diol component precipitates very small amount of cyclic trimer of alkylene terephthalate, which precipitation is observed in conventional polyester resins, even after high temperature and long time of treatment such as retorting applied to food cans, and gives excellent effect to maintain the decorative appearance. As described in Examples given later, the copolyester containing 1% by mole or more of 1,4-CHDM component, which is an example of the present invention, suppresses the precipitation of cyclic trimer to a very small amount even after the retorting, thus maintains good decorative appearance. To the contrary, the polyesters given in Comparative Examples composed of the same components to that of Examples except for eliminating 1,4-CHDM component precipitates the cyclic trimer as white powder on the surface of the resin, and deteriorates the decorative appearance.

If the content of 1,4-CHDM in the copolyester in the upper resin layer is less than 1% by mole, the effect of suppressing the precipitation of oligomer becomes insufficient. If the content thereof exceeds 10% by mole, the range is in saturated state of the precipitation-suppression effect so that further addition of the component merely increases the cost. When the upper resin layer is structured by two or more kinds of polyesters, the content of 1,4-CHDM is defined by the content to the total polyester resin in the upper resin layer.

Regarding the method for adjusting the 1,4-CHDM content to the above range, for an example case of copolymer of terephthalic acid, ethylene glycol, and 1,4-cyclohexane dimethanol, the synthesis of polyethylene terephthalate is conducted by a method of using 1,4-cylcohexane dimethanol as the comonomer, or a method of blending polyethylene terephthalate with polycyclohexane-1,4-dimethylene terephthalate.

The melting point of the copolyester in the upper resin layer according to the present invention is preferably 220° C. or above in view of heat resistance. The term "melting point of the copolyester" referred to herein signifies what is called the endothermic peak temperature during melting, detected by differential scanning calorimetry (DSC method). If plurality of endothermic peaks appeared during melting, the maximum peak is selected.

The plane orientation factor of the copolyester in the upper resin layer according to the present invention is preferably in a range from 0.01 to 0.05. If the plane orientation factor is 0.01 or larger, the amount of oriented component in the copolyester resin is sufficient so that the resin has excellent impact resistance. Therefore, an accidental drop of the can not-easily breaks the resin, and the can has excellent corrosion resistance. The plane orientation factor of 0.05 or smaller is superior in formability and makes easy for can-forming.

(Accumulated Resin)

According to the present invention, the total of upper resin layer and the lower resin layer is called the accumulated resin or an accumulated resin layer. According to the resin-coated steel sheet of the present invention, the amount of cyclic trimer of alkylene terephthalate being contained in the accumulated resin has to be 0.9% or less by mass to the total amount of the resin. If the total content of the cyclic trimer exceeds 0.9% by mass, the precipitation of the cyclic trimer cannot be suppressed even when the content of 1,4-CHDM in the upper resin layer is specified to the above range. If the content thereof is 0.9% by mass or less, the precipitation of the cyclic trimer of the alkylene terephthalate is suppressed even after the high temperature and long time of treatment such as retorting applied to food cans, thereby performing the excellent effect in assuring decorative appearance. From the industrial point of view, the content of cyclic trimer in the accumulated resin is targeted to a range from 0.3 to 0.9% by mass. Decrease of the content of cyclic trimer to below 0.3% by mass is difficult in industrial practice so that the resin cost increases without merit. Preferable content of the cyclic trimer is in a range from 0.3 to 0.7% by mass.

Accordingly, it is important that the content of oligomer, specifically of cyclic trimer of alkylene terephthalate, in the resin used for upper and lower resin layers according to the present invention is decreased to 0.9% by mass or less. The means to decrease the amount of oligomer is not specifically limited. For example, an applicable method is to form a polyester film, and then to extract the oligomer with water or an organic solvent to remove from the film. Another effective method is to conduct polymerization in the stage of preparing master batch of polyester so as the formation of oligomer to decrease. That is, the decreasing method includes the heating method under reduced pressure, solid phase polymerization method, and the above-given extraction method. Those methods can be applied separately or in combination.

The thickness of the accumulated resin is preferably in a range from 5 to 30 μm, and more preferably from 10 to 20 μm.

Regarding the crystal structure of the accumulated resin, the crystal size on (100) plane, determined by X-ray diffractometry, is preferably in a range from 6 to 8 nm. If the crystal size is 6 nm or larger, the thermal stability of the crystal structure is sufficient, and easily maintains adequate flowability on forming the resin layer on the metal sheet, thus readily attaining formation. The crystal size of 8 nm or smaller allows easy flow of resin in melting, and gives sufficient affinity with metal sheet, thus the adhesion becomes sufficient on forming the resin on the metal sheet. The crystal size on (100) plane is determined by the reflection X-ray diffractometry using Sherrer's equation. When the resin layer is a biaxially stretched film, it is preferable that the above crystal structure is established in the original film state before laminating the metal sheet.

The above-described crystal size on (100) plane of 6 to 8 nm depends on the polymer structuring the resin layer, the additive, and further the stretching condition, the heat treatment condition, and other conditions. By adequately establishing these conditions, the desired crystal size on (100) plane is attained. For example, it is preferable that the heat treatment temperature is increased or the heat treatment time is increased. However, these conditions shall be within a range to satisfy the characteristics required for the resin.

When the accumulated resin according to the present invention is a laminated biaxially stretched polyester film, it is preferable that the difference in the intrinsic viscosity between the upper resin layer and the lower resin layer is in a range from 0.01 to 0.5 from the point of generating excellent laminate characteristics and impact resistance.

Following is the description of further preferred mode of the resin-coated steel sheet according to the present invention.

The following may be regarded as the second aspect of the present invention. That is, the following description is about the resin-coated metal sheet for food containers, giving excellent taking-out performance of contents from the can while satisfying the above-described requirements for the outer surface of the can. According to the resin-coated steel sheet of the present invention, therefore, the above-described upper and lower resin layers (accumulated resin) are formed on one side of the metal sheet, while a third resin layer (described below) is formed on the opposite side of the metal sheet. The resin-coated steel sheet described below is assumed to be the one in which the above-described upper and lower resin layers come to the outer side of the formed can, and the side that has the third resin layer (described below) comes to the inner surface of the can.

(Third Resin Layer)

For all the above-described resin-coated metal sheets according to the present invention, it is preferable that an opposite side of the metal sheet to the side having upper and lower rein layers thereon has a third resin layer having polyester containing 0.1 to 2% by mass of wax or 0.1 to 5% by mass of olefin resin.

To let wax or olefin resin as the additive being contained in the resin is (c) to decrease the surface free energy of resin and (d) to give lubrication to the surface of resin. With the effect of (c), the contents become difficult to adhere to the surface of resin, and with the effect of (d), the friction factor on the resin surface is decreased to drastically improve the taking-out performance of the contents. The term "taking-out performance of the contents" referred to herein signifies the evaluation of degree of discharge of the contents from the container. If the characteristic is deteriorated, the contents strongly adhere to the inner surface of the container on taking-out the contents from the container, which makes difficult to take out the contents. The improvement of the taking-out performance of contents is extremely important to assure the purchasing behavior of consumers because the performance closely relates to the purchasing behavior of consumers. The term "be contained" in the "To let wax or olefin resin as the additive being contained" referred to herein signifies all kinds of states integrating with the resin, such as adhesion, lamination, mixing, or modification, and the state is generally achieved by adding these substances when the resin is melted in the film-forming step.

The content of the wax is specified to 0.1% or more because 0.1% or more of the content makes the above (c) and (d) effective, and the taking-out performance of the contents improves. The content of the wax is specified to 2% or less because the range is also easy in film-forming technology, and is preferred in view of productivity. Applicable components of the adding wax include organic lubricant or inorganic lubricant. As of these, organic lubricant such as fatty acid ester is preferred. Among the organic lubricants, carnauba wax (main component: $CH_3(CH_2)_{24}COO(CH_2)_{29}CH_3$) which is a natural wax of plant wax is preferred. The carnauba wax may contain other fatty acid ester composed of various fatty acids and various alcohols. Alternatively, a stearate is also a preferred organic lubricant because it has large effect of (c) and (d) and it is easily added to the film owing to the molecule structure.

The content of olefin is specified to 0.1% or more because 0.1% or more of the content increases the probability of presence of the olefin rein on the surface of the third resin layer, which improves the taking-out performance of the contents owing to the contribution of (c) and (d), and because larger than 5% of the content almost saturates the contribution of (c) and (d). To attain the coverage of resin surface by the contained olefin resin and to secure the desired productivity, the content of the olefin resin is preferably in a range from 0.1 to 5%, and more preferably from 1 to 3%.

The plane orientation factor of the third resin layer according to the present invention is preferably in a range from 0.02 to 0.06. If the plane orientation factor thereof is 0.02 or more, the quantity of oriented component of polyester in the third resin layer becomes sufficient so that the excellent impact resistance is attained. Therefore, an accidental drop of the can not-easily breaks the third layer resin, and also the can has excellent corrosion resistance. The plane orientation factor of 0.06 or less is superior in formability and makes easy for can-forming, and more preferably in a range from 0.03 to 0.05.

The polyester used for the third resin layer according to the present invention is preferably a biaxially stretched polyphthalate ester giving 150 msec or more of the relaxation time $T1\rho$ at 1,4 position carbons in the benzene ring, determined by structural analysis of solid high resolution NMR spectra.

The polyphthalate ester is an ester prepared by polymerization or copolymerization of orthophthalic acid, isophthalic acid, and/or terephthalic acid as the dicarboxylic acid component with diols. The diols are not specifically limited.

The biaxially stretched film has superior characteristics to those of the non-stretched film, increases tensile strength, tear strength, and impact strength, and decreases water-vapor permeability and gas permeability. The relaxation time $T1\rho$ expresses the molecule mobility. Increase in the relaxation time $T1\rho$ tends to decrease the mobility of amorphous portion in the film. Accordingly, when the polyphthalate ester resin is brought into the biaxially stretched state, and the relaxation time $T1\rho$ of the 1,4 position carbons in the benzene ring is determined, and when the molecule regularity of the 1,4 position carbons is monitored, the crystalline state of the amorphous portion of the resin film during forming is determined. By conducting the biaxial stretch of polyphthalate ester resin so as the relaxation time $T1\rho$ of the 1,4 position carbons in the benzene ring to bring 150 msec or more, the mobility of the amorphous portion is decreased, thereby suppressing the re-orientation behavior for crystallization. As a result, a stable structure resembling the crystal structure is formed, and excellent formability and impact resistance can be attained even in the case of severe forming such as deep drawing after lamination. From these points of view, the relaxation time $T1\rho$ of 1,4 position carbons in the benzene ring is more preferably 180 msec or more, and most, preferably 200 msec or more.

An applicable method to bring the relaxation time $T1\rho$ of 1,4 position carbons in the benzene ring to 150 msec or more is a combination of high temperature preheating method and high temperature stretching method in the longitudinal stretching step during film-manufacturing process. The applicable method is not necessarily limited to the above, and 150 msec or higher relaxation time $T1\rho$ of 1,4 position carbons in the benzene ring can be attained by, for example, optimization of the intrinsic viscosity of raw material, a type of catalyst, the quantity of diethylene glycol, stretching condition, heat treatment condition and the like. The preheating temperature for longitudinal stretching during film-manufacturing is preferably 90° C. or above, more preferably 100° C. or above, and most preferably 110° C. or above. The stretching temperature is preferably 105° C. or above, more preferably 110° C. or above, and most preferably 115° C. or above.

For the third resin layer composed of a biaxially stretched polyphthalate ester which has the relaxation time $T1\rho$ of 150 msec or more at 1,4 position carbon of benzene ring, determined by structural analysis of solid high resolution NMR spectra, the zone having 0.02 or smaller double refractive index is preferably a zone less than 5 μm of depth from the interface with the metal sheet.

According to the manufacture of laminated metal sheet, the resin film is brought into contact with a heated metal sheet to adhere them together under pressure. In this case, a general procedure is that the film at interface with the metal sheet melts, and the wetting on the metal sheet achieves the adhesion of the film. Therefore, to secure the adhesion of film with metal sheet, it is necessary to bring the film melt. As a result, the film after lamination unavoidably decreases in the double refractive index at a portion contacting with the metal sheet. As specified by the present invention, if the double refractive index of the film at the portion is 0.02 or less, the film melt-wetting under lamination is sufficient, thus allowing to secure the excellent adhesion.

The zone having 0.02 or smaller double refractive index is preferably limited to a zone less than 5 μm of film depth from the interface with the metal sheet. The reason of the limitation is described below.

When the film is fully melted, the effect of the film becomes small even when the relaxation time T1ρ is controlled to decrease the molecule mobility, and readily generating the crystallization during succeeding forming treatment and/or heat treatment, thereby raises a drawback of deterioration of film formability. To assure the film adhesion as described above, the film melt-wetting is essential. By controlling the thickness of the portion of melted film, or the portion giving 0.02 or smaller double refractive index of film, to smaller than 5 μm, the third resin layer (film laminated layer) which becomes the inner surface of the container after forming the container assures the adhesion, and maintains the formability at high level.

The double refractive index of the polyester resin layer in the depth direction, such as the double refractive index of the third resin layer in the thickness direction, is determined generally by the following method.

The metal sheet is removed from the laminated metal sheet. Then, the retardation in the thickness direction of the resin layer is determined using a polarization microscope, thus deriving the double refractive index in the cross sectional direction of the resin film. The incident linear polarized light in the film is divided into the linear polarized lights in two main refractive index directions. At that moment, the light oscillation in the higher refractive index direction delays from the light oscillation in the lower refractive index direction, which induces a phase difference at the point of leaving the film layer. The phase difference is called the "retardation (R)", and the relation with the double refractive index (Δn) is defined by the formula (1).

$$\Delta n = R/d \quad (1)$$

where, d is the thickness of the film.

The method for determining the retardation is described below. By letting the monochromatic light pass through a polarization plate, the linear polarized light is obtained. The linear polarized light is irradiated to the sample (film). Since the incident light generates retardation as described above, the light becomes an elliptical polarized light after passing through the film layer. When the elliptical polarized light passes through a senarmont compensator, the polarized light becomes a linear polarized light having an angle θ to the oscillation direction of the original linear polarized light. The measurement of θ is given by rotating the polarization plate. The relation between the retardation (R) and θ is defined by the formula (2).

$$R = \lambda \cdot \theta / 180 \quad (2)$$

where, λ is the wavelength of monochromatic light.

Accordingly, the double refractive index (Δn) is defined by the formula (3) which is derived from the formulae (1) and (2).

$$\Delta n = (\theta \cdot \lambda / 180)/d \quad (3)$$

The double refractive index of the accumulated resin which is expected to be used on outer surface of the container is described below. To improve the adhesion, the accumulated resin is naturally preferred to have a zone of 0.02 or smaller double refractive index. For the case of accumulated resin to become outer surface of the container, however, the range containing the zone of 0.02 or smaller double refractive index may exist at 5 μm or larger depth in the thickness direction, different from the case of the third resin layer which becomes inner surface of the container.

If the third resin layer is formed by a plurality of resin layers, at least uppermost layer of the third resin layer, i.e., the resin layer contacting with the contents of the container, contains the wax or the olefin resin. In that case, the content of wax or olefin resin is preferably in a range from 0.10 to 2% by mass or from 0.1 to 5% by mass, respectively, to the uppermost layer of the third resin layer of the laminated structure. With that structure, the performance of taking-out the contents is improved at low cost.

(Coloring Matter)

For all the resin-coated steel sheets according to the present invention, a coloring matter is preferably contained in at least one layer selected from the group consisting of the upper resin layer, the lower resin layer, and the third resin layer. By adding the coloring matter to the upper resin layer, the lower resin layer, and/or the third resin layer, the base metal sheet is concealed and various colors inherent to the resin can be provided. From the object to conceal the base metal sheet, the coloring matter is preferably added to the resin layer close to the metal sheet, as far as possible, such as the lower resin layer. On the other hand, light brightness color utilizing the gloss of base metal can be provided to attain excellent decorative appearance. Furthermore, different from the printing on the resin surface, since the coloration is done by directly adding the coloring matter to the resin, there arises no problem of discoloration during the container-forming process, and good appearance can be maintained. Generally the coating and printing are applied after forming the container. A part of the process can be eliminated by forming the colored resin layer, which allows cost reduction and suppression of generation of organic solvent and carbon dioxide.

Although the coloring matter may be a dyestuff and/or a pigment, pigment is preferred.

A preferable pigment is the one that functions excellent decorative appearance after forming the container. From that point of view, inorganic pigments such as titanium dioxide and dis-azo organic pigment can be used. Since those pigments have strong coloring power and high flexibility, they are suitable because of assuring good decorative appearance after forming the container. In particular, as the pigment to be added to the third resin layer that becomes the inner surface of the container, titanium dioxide is preferred because the titanium dioxide enhances excellent color of contents and gives clean appearance after opening the container. On the other hand, as the pigment to be added to the accumulated resin becoming the outer surface of the container, (the upper resin layer and/or the lower resin layer), use of a dis-azo pigment is preferred because the pigment has excellent transparency while giving strong coloring power and strong extensibility, thus attaining light brilliant appearance after forming the container.

The adding quantity of titanium dioxide to the target resin layer is preferably in a range from 5 to 30% by mass. If the content of titanium dioxide is 5% by mass or more, sufficient white degree is attained, and good decorative appearance is assured. When the content of titanium dioxide exceeds 30% by mass, the white degree saturates. Consequently, the content of titanium dioxide is preferably 30% by mass or less in economical point of view, and more preferably in a range from 10 to 20% by mass. The adding quantity of coloring matter is the ratio to the resin layer containing the coloring matter. For example, when the coloring matter is added to the lower resin layer, the adding quantity is the ratio of the coloring matter to the lower resin layer.

Examples of applicable dis-azo pigment in the present invention include at least one kind of pigment yellow 12, 13, 14, 16, 17, 55, 81, 83, 180, and 181 of the color index (the C.I. registered name). In particular, from the viewpoints of clearness of color (light brilliancy) and anti-bleeding performance in a retorting environment (suppression performance to the phenomenon of precipitating pigment onto the film surface), a pigment having large molecular weight and small solubility in PET resin is preferred. For example, C.I. pigment yellow 180 having a structure of benzimidazolone with 700 or larger molecular utilization is more preferably used.

The adding quantity of dis-azo pigment to the target resin layer is preferably in a range from 0.1 to 2% by mass. The adding quantity of 0.1% by mass or more is suitable because of the excellent coloring, and the adding quantity of 2% by mass or less is suitable because of increased transparency and of giving light brilliant color.

The method for manufacturing the raw material film for lamination as the upper or lower resin layer or the third resin layer according to the present invention is described below. The manufacturing method is not specifically limited, and conventional methods can be applied. For example, each polyester resin is dried, at need, and then separately and/or respective ones are supplied to a known melt-lamination extruder, and the resin is extruded through a slit-shaped die to form a sheet. Thus obtained sheet is attached to a casting drum by static electricity method or the like to cool and solidify the sheet, thus obtaining a non-stretched sheet.

The non-stretched sheet is stretched in the longitudinal direction and the width direction of the film to form a biaxially stretched film. The magnitude of stretch is arbitrarily selected depending on the orientation, strength, modulus of elasticity, and other variables of the target film. A preferred stretching method is the tenter method in view of the film quality. As of the tenter method, preferred ones are the successive biaxial stretch method which applies the longitudinal stretching, followed by the width directional stretching, and the simultaneous biaxial stretch method which applies almost simultaneously the longitudinal and width directional stretching.

As the method to add coloring matter to the target resin layer, the following one is generally applied. That is, polyester chips before treating by the solid polymerization are melted, and the coloring matter is blended with the melted chips. Then, the colored polyester chips and the non-colored polyester chips are blended together at a specified ratio, which mixture is melted to extrude.

The method for manufacturing resin-coated metal sheet according to the present invention is described below. The film formed in above-example is laminated onto the metal sheet to manufacture the resin-coated metal sheet. For example, a metal sheet is heated to a temperature above the melting point of the film, and the resin film is attached onto each side of the heated metal sheet using a press roll (hereinafter referred to as the "laminate roll"), thus thermal lamination.

The lamination condition is adequately selected to obtain the resin layer specified by the present invention. For example, when the temperature of starting the lamination is selected to 280° C. or above, the thermal history on the film until the end of the lamination is selected preferably to a range from 1 to 20 msec of contacting the film at the melting point or above. To attain that laminating condition, it is necessary to, adding to the lamination at high speed, cool the film during adhesion. Although the compressive force during lamination is not specifically limited, the face pressure in a range from 9.8 to 294 N (1 to 30 kgf/cm$^2$) is preferred. Within that range of face pressure, the thermal history of film can be kept in the above preferable range, and sufficient adhesion is attained. Even in a short time, the ultimate temperature of the resin interface is satisfactory for thermal lamination of the resin, and gives sufficient adhesion.

According to the present invention, in principle the lower resin layer, the upper resin layer, or the third resin layer are formed into film, followed by covering the metal sheet. If, however, the specification of the target resin layer is within the range of the present invention, the melt-extrusion lamination may be applied. According to the method, the formation of resin may not be formed into film but is melted to directly cover the surface of metal sheet.

An example method for manufacturing the film of an accumulated resin is the co-extrusion method, in which the resin for the upper layer and the resin for the lower layer are separately supplied to the respective extruders, and they are laminated with each other within a feed block located above the respective dies to directly obtain a film sheet. An alternative and suitable method is to form a film consisting only of the resin for lower layer, in advance, then the resin for the upper layer is extruded onto thus formed film of the resin for lower layer to laminate them together. From the point of productivity, the co-extrusion method is preferred.

EXAMPLES

The following is the description about Examples of the present invention.

A cold-rolled steel sheet having 0.18 mm in thickness and 977 mm in width was treated by degreasing and pickling. Thus treated cold-rolled steel sheet was plated in a plating bath containing $CrO_3$, $F^-$, and $SO_4^{2-}$ to obtain a chromium-plated steel sheet (ECCS). The plated steel sheet was rinsed, and then was electrolyzed in a chemical conversion treatment liquid containing $CrO_3$ and $F^-$. The electrolysis conditions (current density, electric quantity, and the like) in the chemical conversion treatment were controlled to adjust the coating weight of metallic chromium and of chromium hydroxide to 120 mg/m$^2$ and 15 mg/m$^2$ as Cr, respectively.

With the coating apparatus shown in FIG. 1, the prepared chromium-plated steel sheet 1 was heated in a metal-strip heating apparatus 2, on which there was thermally laminated the respective films 4a and 4b given in Table 1-1, Table 1-2, Table 2-1, and Table 2-2 as the resin films on both sides of the chromium-plated steel strip 1 using laminate-rolls 3 to manufacture a coated metal sheet, which resin films became the inner surface and the outer surface, respectively, after forming the steel strip into a container. The film of the accumulated resin becoming outer surface of the container adopted a film structured by laminating the lower resin layer and the upper resin layer, in advance, to coat so as the lower resin layer to contact with the metal sheet. The applied method for manufacturing the film of the accumulated resin was the co-extrusion method in which the resin for the upper layer and the resin for the lower layer were separately supplied to the respective extruders, and they were laminated with each other within a feed block located above the respective dies to directly obtain a film sheet.

The laminate rolls 3 were internal water-cooling type to forcefully circulate cooling water therethrough to cool the rolls during thermal lamination of film.

The following is the description of measurement and evaluation methods of the characteristics of applied film, the manufactured resin-coated metal sheet, and the film characteristics on the coated metal sheet.

(1) Relaxation Time T1ρ

The applied solid NMR apparatus was: Spectrometer JNM-GX270 (JEOL Ltd.), solid amplifier (JEOL Ltd.), MAS Controller NM-GSH27MU (JEOL Ltd.), and Probe NM-GSH27T (JEOL Ltd.) The T1ρ of $^{13}C$ nuclei (vertical axis relaxation in rotating coordinate) was determined. The conditions were 24.5° C., 50% RH, 6.34 T of static magnetic field intensity, and 270.2 MHz and 67.9 MHz of the resonance frequency of $^1H$ and $^{13}C$, respectively. To chancel the effect of an isotropy of chemical shift, the Magic angle spinning (MAS) method was applied. The spinning was in a range from 3.5 to 3.7 kHz. The condition of pulse series for $^1H$ was 90°, 4 μsec of pulse width, and 62.5 kHz of locking magnetic field intensity. The contact time of cross polarization (CP) to transfer the polarization of $^1H$ to $^{13}C$ was 1.5 msec. The holding time τ was 0.001, 0.5, 0.7, 1, 3, 7, 10, 20, 30, 40, and 50 msec. Thus, the free induction decay (FID) of the $^{13}C$ magnetized vector after holding time τ was determined, (a high output coupling was given to eliminate the influence of bipolar mutual action by $^1H$ during the FID determination, and 512 times of multiplication was given to improve S/N.) The pulse-repeating time was in a range from 5 to 15 sec.

The T1ρ is generally expressed by the following formula. By plotting the peak intensities observed to the respective holding times on a semi-log paper, the T1ρ is derived from the slope of the curve.

$$I(t)=\Sigma(Ai)\exp(-t/T1\rho i)$$

where, Ai is the fraction of the component to T1ρi

In this case, the analysis was given on a two component system (T1ρ1: amorphous component, T1ρ2: crystalline component), and the value was derived using the following formula applying the least-square fitting method.

$$I(t)=fa1\cdot\exp(-t/T1\rho 1)+fa2\cdot\exp(-t/T1\rho 2)$$

where, fa1 is the fraction of the component to T1ρ1, fa2 is the fraction of the component to T1ρ2, and fa1+fa2=1.

The T1ρ used T1ρ2.

(2) Melting Point

The applied film was crystallized to determine the melting point using a differential scanning calorimeter (DSC-2, Parkin-Elmer) at 10° C./min of temperature-rising speed.

(3) Crystal Size

The crystal size on (100) plane was determined by reflection X-ray diffractometry using Sherrer's equation. The measured X-ray wavelength was 0.15418 nm (CuKα). The diffraction on (100) plane was observed at about 12.7° of Bragg angle.

(4) Double Refractive Index of Resin

In accordance with the method given in the embodiment, after removing the metal sheet from the resin-coated metal sheet, the retardation in the cross sectional direction on the third resin layer (resin film on inner surface of the container) was determined using a polarization microscope, thus derived the double refractive index in the cross sectional direction of the film. The double refractive index of the accumulated resin (resin film on outer surface of the container) can be determined in a similar procedure.

(5) Determination of the Content of Cyclic Trimer of Alkylene Terephthalate in the Accumulated Resin Film A known method was applied to determine the content of cyclic trimer in the accumulated resin film. A 50 mg of film sample was dissolved in 2 ml of mixed solvent (hexafluoroisopropanol/chloroform=50/50). To the mixture, 8 ml of chloroform was added, and further acetonitrile was added to 100 ml. An aliquot of the mixture was filtered, and the filtrate was analyzed by reversed phase HPLC to determine the cyclic trimer of ethylene terephthalate.

(6) Resistance to White Haze

The resin-coated metal sheet was placed in a retort, and retorting was conducted at 125° C. for 90 minutes.

After the treatment, the quantity of oligomer precipitated on the surface of the resin-coated metal sheet was determined by the following method to evaluate the resistance to white haze.

The surface of film on the laminated steel sheet cut to 4 cm×4 cm size was rubbed to clean by an absorbent cotton impregnated with a specified amount of methanol, which cotton was then rinsed by 10 ml of acetonitrile. An aliquot of the rinsed liquid was filtered, which filtrate was then analyzed by reversed phase high-performance liquid chromatography to determine the cyclic trimer of ethylene terephthalate.

(Evaluation Ranking)

◯: Precipitate of the cyclic trimer was less than 0.5 μg/cm$^2$, (the level that the precipitate of cyclic trimer cannot be identified by visual observation)

Δ: Precipitate of the cyclic trimer was 0.5 μg/cm$^2$ or more and less than 1.0 μg/cm$^2$, (the level that the precipitate of cyclic trimer is identified by visual observation)

X: Precipitate of the cyclic trimer was 1.0 μg/cm$^2$ or more (Precipitation of the cyclic trimer was significant, and the surface became white haze)

(7) Plane Orientation Factor

The refractive index in the longitudinal direction, the width direction, and the thickness direction, (Nx, Ny, and Nz, respectively), was determined using an Abbe's refractometer applying sodium D-ray (589 nm of wavelength) as the light source. Then, the plane orientation factor Ns was derived by the calculation of Ns=(Nx+Ny)/2−Nz. The observation was given at 10 points (arbitrary positions) on the film after coating, and the average value of them was adopted as the plane orientation factor of the present invention.

(8) Taking-out Performance of Contents

Using a draw-molding machine, the resin-coated metal sheet prepared in the above steps was formed into a cup under the condition of 100 mm of blank diameter and 1.88 of drawing ratio (the diameter before forming to the diameter after forming). Then, the cup was filled with homogeneously mixed eggs, oatmeal, and meat. After seaming the cup lid, the cup was treated by retorting (at 130° C. for 90 minutes). After that, the lid was removed, and the cup was turned upside down to discharge the contents. The amount of contents left inside of the cup was observed. Furthermore, the cup was shaken for two to three times to discharge the contents, and then the amount of contents left inside of the cup was observed. Thus, the easiness of taking-out the contents from the cup was evaluated.

(Evaluation Ranking)

⊚: Only once turning the cup upside down, (not shaking the cup by hands), the contents were discharged, and no adhesion was left inside of the cup.

◯: Although the contents were left inside after only once turning the cup upside down, shaking the cup by hands for two to three times brought the cup leaving no adhesion of contents inside the cup.

X: Even after shaking the cup with hands for two to three times, the contents were difficult to be fully discharged.

(Formability)

After applying wax to the resin-coated metal sheet, a disk having 179 mm in diameter was punched from the metal sheet, which disk was drawn to 1.80 of drawing ratio, thus obtained a shallow drawn can. The shallow drawn can was further subjected to drawing at drawing ratio of 2.20 and 2.90, respectively. After that, the drawn cans were treated by dome-forming using a known method, followed by trimming and by neck-in-flanging, thus forming deep drawn cans. Focusing on the neck-in position of thus obtained deep drawn cans, the degree of damage of film was visually observed.

(Evaluation Ranking)

⊚: No damage was generated on the film after can-forming, and no film-discoloration was observed.

○: Although can-forming was applicable, film-discoloration was observed.

X: The can was fractured at the body portion, and can-forming could not be performed.

(10) Resistance to Retort Blushing

The target cans were the ones that acquired the "formable" evaluation (○ or higher rank) in the (9) Formability. After the can was filled with city water at normal temperature, a lid was seamed to close the can. Then, the can was placed in a retort facing the can bottom down, and the retorting was conducted at 125° C. for 90 minutes. After the retorting, the changes of appearance on outer surface of the can bottom were visually observed.

(Evaluation Ranking)

⊚: No change was observed in appearance.

○: Slight cloudiness was observed in appearance.

X: Clouded in appearance (generation of blushing).

XX: Significantly clouded in appearance (generation of significant blushing).

(11) Adhesion

The target cans were the ones that acquired the "formable" evaluation (○ or higher rank) in the (9) Formability. Samples for peel test, (15 mm in width and 120 mm in length), were cut from the can body section. A portion of the film on the cut sample was peeled at a major side edge of the sample. The peeled film was opened in reverse direction (by 180°) from the peeling direction, and the peel test was given at 30 mm/min of tensile speed in a tensile tester, thus determined the adhesion per 15 mm of width. The target surface to determine the adhesion was inner surface of the can.

(Evaluation Ranking)

⊚: 1.47 N/15 mm or more (0.15 kgf/15 mm or more)

○: 0.98 N/15 mm or more and less than 1.47 N/15 mm (0.10 kgf/15 mm or more and less than 0.15 kgf/15 mm)

X: less than 0.98 N/15 mm (less than 0.10 kgf/15 mm)

(12) Impact Resistance

The target cans were the ones that acquired the "formable" evaluation (○ or higher rank) in the (9) Formability. After filling each of ten pieces of these cans with city water, the can lid was seamed to seal the can. After that, the can was dropped onto a tile floor made from polyvinyl chloride. Then, the lid was removed, and the water in the can was drained. A portion of film was removed to expose the surface of steel sheet. The can was then filled with 5% brine, to which a platinum electrode was immersed at center position of the can as the cathode, while using the upper edge part of can, (exposed part of the steel sheet), as the anode. After 3 seconds had passed from the start of impressing 6V of voltage between the platinum electrode and the can, the current was read to determine the average value of ten cans.

(Evaluation Ranking)

⊚: less than 0.01 mA

○: 0.01 mA or more and less than 0.1 mA

X: 0.1 mA or more

The obtained results are summarized in Table 1-1, Table 1-2, Table 2-1, Table 2-2, and Table 3.

As seen in Table 3, Examples of the present invention show excellent resistance to white haze (precipitation of the cyclic trimer) and resistance to retort blushing, and also maintain excellent decorative appearance even after retorting. Furthermore, Examples of the present invention give good characteristics such as formability and adhesion. To the contrary, Comparative Examples are inferior in any of resistance to white haze (precipitation of the cyclic trimer) and resistance to retort blushing, and they are difficult to maintain the decorative appearance after retorting.

TABLE 1-1

| | Third resin layer (applied to inner surface of the container) | | | | | | | |
|---|---|---|---|---|---|---|---|---|
| | Kind of resin | | Thickness (μm) | | | | Contained wax/olefin resin | |
| No. | Lower layer | Upper layer | Lower layer | Upper layer | Melting point of resin (° C.) | T1ρ (msec) | Kind | Added quantity (mass %) |
| Example 1 | PET[1]) (Single layer) | | 15 | | 255 | 220 | Ethylene-propylene copolymer | 1.0 |
| Example 2 | PET | | 15 | | 255 | 220 | Modified polyethylene | 1.0 |
| Example 3 | PET | | 15 | | 255 | 220 | High density polyethylene | 1.0 |
| Example 4 | PET | | 15 | | 255 | 220 | Low density polyethylene | 1.0 |
| Example 5 | PET | | 15 | | 255 | 400 | Ethylene-propylene copolymer | 1.0 |
| Example 6 | PET | | 15 | | 255 | 120 | Ethylene-propylene copolymer | 1.0 |
| Example 7 | PET | | 15 | | 255 | 220 | Ethylene-propylene copolymer | 0.1 |
| Example 8 | PET | | 15 | | 255 | 220 | Ethylene-propylene copolymer | 0.5 |
| Example 9 | PET | | 15 | | 255 | 220 | Ethylene-propylene copolymer | 3.0 |
| Example 10 | PET | | 15 | | 255 | 220 | Ethylene-propylene copolymer | 1.0 |
| Example 11 | PET/I[2]) | PET | 11 | 2 | 225 | 100 | Ethylene-propylene copolymer | 1.0 |
| Example 12 | PET | | 15 | | 255 | 220 | Ethylene-propylene copolymer | 1.0 |
| Example 13 | PET | | 15 | | 255 | 220 | Ethylene-propylene copolymer | 1.0 |
| Example 14 | PET | | 15 | | 255 | 220 | Carnauba wax | 0.8 |
| Example 15 | PET | | 15 | | 255 | 220 | Carnauba wax | 1.0 |
| Example 16 | PET | | 15 | | 255 | 220 | Carnauba wax | 0.9 |
| Example 17 | PET | | 15 | | 255 | 220 | Carnauba wax | 1.1 |
| Example 18 | PET | | 15 | | 255 | 220 | Carnauba wax | 1.0 |

TABLE 1-1-continued

| | Third resin layer (applied to inner surface of the container) | | | | | | | | |
|---|---|---|---|---|---|---|---|---|---|
| | Kind of resin | | Thickness (μm) | | | | | Contained wax/olefin resin | |
| No. | Lower layer | Upper layer | Lower layer | Upper layer | Melting point of resin (°C.) | T1ρ (msec) | Kind | | Added quantity (mass %) |
| Comparative Example 1 | PET | | | 15 | 255 | 220 | — | | — |
| Comparative Example 2 | PET | | | 15 | 255 | 220 | Ethylene-propylene copolymer | | 0.05 |
| Comparative Example 3 | Modified PP[3] | PP[4] | 5 | 15 | 160 | — | — | | — |

[1] Polyethylene terephthalate
[2] Isophthalic acid copolymerized polyethylene terephthalate (copolymerization degree: 12 mol %)
[3] Maleic acid anhydride modified polypropylene
[4] Polypropylene

TABLE 1-2

| | Third resin layer (applied to inner surface of the container) | | | | | | Thermal history at melting point or above in lamination (msec) |
|---|---|---|---|---|---|---|---|
| | Added coloring matter | | | Thickness of layer giving 0.02 or smaller double refractive index after lamination (μm) | Plane orientation factor | Starting temperature in lamination (°C.) | |
| No. | Kind | Target resin layer | Added quantity (mass %) | | | | |
| Example 1 | — | — | — | 2 | 0.03 | 282 | 15 |
| Example 2 | — | — | — | 2 | 0.03 | 282 | 15 |
| Example 3 | — | — | — | 2 | 0.03 | 282 | 15 |
| Example 4 | — | — | — | 2 | 0.03 | 282 | 15 |
| Example 5 | — | — | — | 2 | 0.03 | 282 | 15 |
| Example 6 | Titanium dioxide | Total layer | 10 | 6 | 0.05 | 287 | 26 |
| Example 7 | Titanium dioxide | Total layer | 10 | 3 | 0.03 | 282 | 15 |
| Example 8 | Titanium dioxide | Total layer | 10 | 2 | 0.03 | 282 | 15 |
| Example 9 | Titanium dioxide | Total layer | 10 | 4 | 0.04 | 293 | 23 |
| Example 10 | Titanium dioxide | Total layer | 10 | 8 | 0.06 | 300 | 30 |
| Example 11 | Titanium dioxide | Lower layer | 15 | 3 | 0.03 | 252 | 15 |
| Example 12 | Titanium dioxide | Total layer | 20 | 2 | 0.03 | 282 | 15 |
| Example 13 | Titanium dioxide | Total layer | 15 | 1 | 0.02 | 277 | 9 |
| Example 14 | — | — | — | 2 | 0.03 | 282 | 15 |
| Example 15 | — | — | — | 2 | 0.03 | 282 | 15 |
| Example 16 | — | — | — | 2 | 0.03 | 282 | 15 |
| Example 17 | — | — | — | 2 | 0.03 | 282 | 15 |
| Example 18 | — | — | — | 2 | 0.03 | 282 | 15 |
| Comparative Example 1 | — | — | — | 2 | 0.03 | 282 | 15 |
| Comparative Example 2 | — | — | — | 2 | 0.03 | 282 | 15 |
| Comparative Example 3 | — | — | — | — | — | 190 | 17 |

TABLE 2-1

| | Accumulated resin (applied to outer surface of the container) | | | | | |
|---|---|---|---|---|---|---|
| | Upper resin layer | | | Lower resin layer | | |
| No. | Polyester | Copolymerization degree to PET (mol %) | Thickness (μm) | Polyester | Copolymerization degree to PET (mol %) | Thickness (μm) |
| Example 1 | PET/1,4-CHDM[5] | 2 | 10.5 | PET/SI[6] | 5 | 1.5 |
| Example 2 | PET/1,4-CHDM | 4 | 10.5 | PET/SI | 5 | 1.5 |
| Example 3 | PET/1,4-CHDM | 6 | 10.5 | PET/SI | 5 | 1.5 |
| Example 4 | PET/1,4-CHDM | 8 | 10.5 | PET/SI | 5 | 1.5 |
| Example 5 | PET/1,4-CHDM | 4 | 10.5 | PET/SI | 3 | 1.5 |
| Example 6 | PET/1,4-CHDM | 4 | 10.5 | PET/SI | 7 | 1.5 |
| Example 7 | PET/1,4-CHDM | 4 | 10.5 | PET/SI | 9 | 1.5 |
| Example 8 | PET/1,4-CHDM | 4 | 11.5 | PET/SI | 5 | 0.5 |
| Example 9 | PET/1,4-CHDM | 4 | 9.0 | PET/SI | 5 | 3.0 |
| Example 10 | PET/1,4-CHDM | 4 | 7.0 | PET/SI | 5 | 5.0 |
| Example 11 | PET/1,4-CHDM | 4 | 10.5 | PET/SI | 5 | 1.5 |
| Example 12 | PET/1,4-CHDM | 4 | 10.5 | PET/SI | 5 | 1.5 |

TABLE 2-1-continued

| | Accumulated resin (applied to outer surface of the container) | | | | | |
|---|---|---|---|---|---|---|
| | Upper resin layer | | | Lower resin layer | | |
| No. | Polyester | Copolymerization degree to PET (mol %) | Thickness (μm) | Polyester | Copolymerization degree to PET (mol %) | Thickness (μm) |
| Example 13 | PET/1,4-CHDM | 4 | 10.5 | PET/SI | 5 | 1.5 |
| Example 14 | PET/1,4-CHDM | 4 | 10.5 | PET/SI | 5 | 1.5 |
| Example 15 | PET/1,4-CHDM | 4 | 10.5 | PET/SI | 5 | 1.5 |
| Example 16 | PET/1,4-CHDM | 4 | 10.5 | PET/SI | 5 | 1.5 |
| Example 17 | PET/1,4-CHDM | 4 | 10.5 | PET/SI | 5 | 1.5 |
| Example 18 | PET/1,2-CHDM | 4 | 10.5 | PET/SI | 5 | 1.5 |
| Comparative Example 1 | PET/CHDM | 0.5 | 10.5 | PET/SI | 5 | 1.5 |
| Comparative Example 2 | PET/CHDM | 4 | 10.5 | PET/SI | 0.5 | 1.5 |
| Comparative Example 3 | PET | 0 | 10.5 | PET | 0 | 1.5 |

[5] 1,4-Cyclohexane dimethanol
[6] Metal sulfoisophthalate

TABLE 2-2

| | Accumulated resin (applied to outer surface of the container) | | | | | |
|---|---|---|---|---|---|---|
| | Added coloring matter | | | | | |
| No. | Kind | Target resin layer | Added quantity (mass %) | Content of the cyclic trimer[7] (wt %) | Plane orientation factor | Crystal size |
| Example 1 | — | — | — | 0.7 | 0.03 | 7.0 |
| Example 2 | — | — | — | 0.7 | 0.03 | 7.0 |
| Example 3 | — | — | — | 0.7 | 0.03 | 7.0 |
| Example 4 | — | — | — | 0.7 | 0.03 | 7.0 |
| Example 5 | — | — | — | 0.7 | 0.03 | 7.0 |
| Example 6 | C.I. Pigment yellow 180[8] | Upper layer | 0.6 | 0.7 | 0.03 | 7.0 |
| Example 7 | C.I. Pigment yellow 180 | Upper layer | 1.0 | 0.7 | 0.03 | 7.0 |
| Example 8 | C.I. Pigment yellow 180 | Upper layer | 0.8 | 0.7 | 0.03 | 7.0 |
| Example 9 | C.I. Pigment yellow 180 | Upper layer | 0.6 | 0.7 | 0.03 | 7.0 |
| Example 10 | C.I. Pigment yellow 180 | Upper layer | 0.6 | 0.7 | 0.03 | 7.0 |
| Example 11 | C.I. Pigment yellow 180 | Upper layer | 0.6 | 0.5 | 0.03 | 7.0 |
| Example 12 | C.I. Pigment yellow 180 | Upper layer | 0.6 | 0.8 | 0.03 | 7.0 |
| Example 13 | C.I. Pigment yellow 180 | Upper layer | 0.6 | 0.3 | 0.03 | 7.0 |
| Example 14 | C.I. Pigment yellow 180 | Upper layer | 0.6 | 0.7 | 0.01 | 7.0 |
| Example 15 | C.I. Pigment yellow 180 | Upper layer | 0.6 | 0.7 | 0.05 | 7.0 |
| Example 16 | C.I. Pigment yellow 180 | Upper layer | 0.6 | 0.7 | 0.03 | 6.0 |
| Example 17 | C.I. Pigment yellow 180 | Upper layer | 0.6 | 0.7 | 0.03 | 8.0 |
| Example 18 | C.I. Pigment yellow 180 | Upper layer | 0.6 | 0.9 | 0.03 | 7.0 |
| Comparative Example 1 | — | — | — | 0.7 | 0.03 | 7.0 |
| Comparative Example 2 | — | — | — | 1.0 | 0.03 | 7.0 |
| Comparative Example 3 | — | — | — | 0.7 | 0.03 | 7.0 |

[7] Cyclic trimer of ethylene terephthalate
[8] Benzimidazolone pigment

TABLE 3

| No. | Resistance to white haze | Resistance to retort blushing | Taking-out performance of contents | Formability | Adhesion | Impact resistance |
|---|---|---|---|---|---|---|
| Example 1 | ○ | ◎ | ◎ | ◎ | ◎ | ◎ |
| Example 2 | ○ | ◎ | ◎ | ◎ | ◎ | ◎ |
| Example 3 | ○ | ◎ | ○ | ◎ | ◎ | ◎ |
| Example 4 | ○ | ◎ | ○ | ◎ | ◎ | ◎ |
| Example 5 | ○ | ◎ | ◎ | ◎ | ◎ | ◎ |
| Example 6 | ○ | ◎ | ○ | ◎ | ○ | ○ |
| Example 7 | ○ | ◎ | ○ | ◎ | ◎ | ◎ |
| Example 8 | ○ | ◎ | ○ | ◎ | ◎ | ◎ |
| Example 9 | ○ | ◎ | ○ | ◎ | ◎ | ◎ |
| Example 10 | ○ | ◎ | ◎ | ○ | ○ | ◎ |

TABLE 3-continued

| No. | Resistance to white haze | Resistance to retort blushing | Taking-out performance of contents | Formability | Adhesion | Impact resistance |
|---|---|---|---|---|---|---|
| Example 11 | ○ | ◎ | ◎ | ○ | ◎ | ○ |
| Example 12 | ○ | ◎ | ◎ | ◎ | ◎ | ◎ |
| Example 13 | ○ | ◎ | ◎ | ◎ | ◎ | ○ |
| Example 14 | ○ | ◎ | ◎ | ◎ | ◎ | ○ |
| Example 15 | ○ | ◎ | ◎ | ○ | ◎ | ◎ |
| Example 16 | ○ | ◎ | ◎ | ◎ | ◎ | ◎ |
| Example 17 | ○ | ◎ | ◎ | ◎ | ◎ | ◎ |
| Example 18 | Δ | ◎ | ◎ | ◎ | ◎ | ◎ |
| Comparative Example 1 | X | ◎ | X | ◎ | ◎ | ◎ |
| Comparative Example 2 | X | X | X | ◎ | ◎ | ◎ |
| Comparative Example 3 | X | XX | ◎ | X | — | — |

INDUSTRIAL APPLICABILITY

Since the manufacture of food cans using the resin-coated metal sheet according to the present invention does not induce white haze phenomenon and retort blushing phenomenon on outer surface of the can even after retorting, the decorative appearance on outer surface of the can is not deteriorated. In addition, since the resin-coated metal sheet according to the present invention also has various performances required to food cans, the resin-coated metal sheet can be offered in wide applications as an excellent base material for food containers.

The invention claimed is:

1. A resin-coated metal sheet comprising: a metal sheet; a lower resin layer containing a copolyalkylene terephthalate prepared by copolymerizing 1 to 10% by mole of aromatic dicarboxylic acid having metal sulfonate group and terephthalic acid as a dicarboxylic acid component, formed on at least one side of the metal sheet; and an upper resin layer containing a copolyester derived from a diol component composed of 1 to 10% by mole of a diol derivative of alicyclic compound and 99 to 90% by mole of ethylene glycol, with a dicarboxylic acid component consisting of terephthalic acid, formed on the lower resin layer, the sum of a cyclic trimer of alkylene terephthalate being contained in the upper resin layer and the lower resin layer being 0.9% or less by mass.

2. The resin-coated metal sheet according to claim 1, wherein the diol derivative of alicyclic compound is a dial derivative of cycloparaffin.

3. The resin-coated metal sheet according to claim 2, wherein the diol derivative of cycloparaffin is 1,4-cyclohexanedimethanol.

4. The resin-coated metal sheet according to claim 1, wherein the thickness of the lower resin layer is in a range from 0.5 to 5 μm.

5. The resin-coated metal sheet according to claim 1, wherein a plane orientation factor of the upper resin layer is in a range from 0.01 to 0.05.

6. The resin-coated metal sheet according to claim 1, wherein each of the upper resin layer and the lower resin layer is a biaxially stretched polyester film having a crystal size on the (100) plane in a range from 6 to 8 nm, determined by X-ray diffractometry.

7. The resin-coated metal sheet according to claim 1, further comprising a third resin layer containing a polyester containing any of 0.1 to 2% by mass of wax and 0.1 to 5% by mass of olefin resin, formed on the metal sheet on opposite side to the side of the upper and the lower resin layers.

8. The resin-coated metal sheet according to claim 7, wherein a plane orientation factor of the third resin layer is in a range from 0.02 to 0.06.

9. The resin-coated metal sheet according to claim 7, wherein the third resin layer is a biaxially stretched polyphthalate ester which has a relaxation time T1ρ of 150 msec or more at 1,4 position carbons of benzene ring, determined by structural analysis of solid high resolution NMR.

10. The resin-coated metal sheet according to claim 9, wherein a zone in the third resin layer having 0.02 or smaller double refractive index is a zone less than 5 μm of depth from an interface with the metal sheet.

11. The resin-coated metal sheet according to any one of claims 1 to 3 or 4 to 10, wherein at least one layer selected from the group consisting of the upper resin layer, the lower resin layer, and a third resin layer contains a coloring matter.

12. The resin-coated metal sheet according to claim 11, wherein the coloring matter is a dis-azo organic pigment.

13. A resin-coated metal sheet for container, comprising a metal sheet and a resin layer containing a polyester as a main component, being formed on at least one side of the metal sheet, the resin layer being an accumulated resin layer having an upper layer and a lower layer contacting the metal sheet, the upper layer of the resin layer being formed by a polyester derived from a dicarboxylic acid component mainly composed of terephthalic acid and a glycol component mainly composed of ethylene glycol and 1,4-cyclohexanedimethanol, while the content of the 1,4-cyclohexanedimethanol in the total glycol component being in a range from 1 to 10% by mole, the lower layer of the resin layer being formed by a copolyalkylene terephthalate prepared by copolymerizing 1 to 10% by mole of aromatic dicarboxylic acid having metal sulfonate group and terephthalic acid as a dicarboxylic acid component, and a content of oligomer in the accumulated resin being in a range from 0.3 to 0.9% by mass.

* * * * *